(12) United States Patent
Chien

(10) Patent No.: US 7,232,251 B2
(45) Date of Patent: Jun. 19, 2007

(54) NIGHT LIGHT WITH FIBER OPTICS

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 40 days.

(21) Appl. No.: 11/092,741

(22) Filed: Mar. 30, 2005

(65) Prior Publication Data
US 2006/0227573 A1    Oct. 12, 2006

(51) Int. Cl.
F21V 33/00 (2006.01)
F21V 1/00 (2006.01)
H01R 33/00 (2006.01)
(52) U.S. Cl. .................................. 362/644; 362/641
(58) Field of Classification Search ........ 362/641–644, 362/282, 554
See application file for complete search history.

(56) References Cited

U.S. PATENT DOCUMENTS 4,141,156 A * 2/1979 Holtvoigt .................. 434/139
5,829,862 A * 11/1998 Ferrell .......................... 362/554
6,390,647 B1 * 5/2002 Shaefer ........................ 362/276
6,543,925 B2 * 4/2003 Kuykendal et al. ......... 362/554
6,776,505 B1 * 8/2004 DeWitt ........................ 362/249
6,926,426 B2 * 8/2005 Currie et al. ................ 362/282

* cited by examiner

Primary Examiner—Sandra O'Shea
Assistant Examiner—James W Cranson, Jr.
(74) Attorney, Agent, or Firm—Bacon & Thomas, PLLC

(57) ABSTRACT

A night light with fiber optics has a main object and a fiber optics arrangement to let visible wavelength light beams be seen by a viewer after passing through the fiber optics. The main object material can be selected from textile, metal, plastic, porcelain, ceramic, or viscous-mud related items, wooden toys, stuffed toys, blow-mold unit, seasonal items, dolls, porcelain units, ceramic units, poly resin units, as well as a sporting related unit, painting unit, poster unit, sign unit, photo unit, angel unit, artificial related unit, animal unit, flower unit or other conventional units in a variety of gift, toy, sports, seasonal, holiday applications to make the night light exhibit more attractive light effects than the original main objects. The night light may incorporate a switch that provides selected preferred light functions.

14 Claims, 5 Drawing Sheets

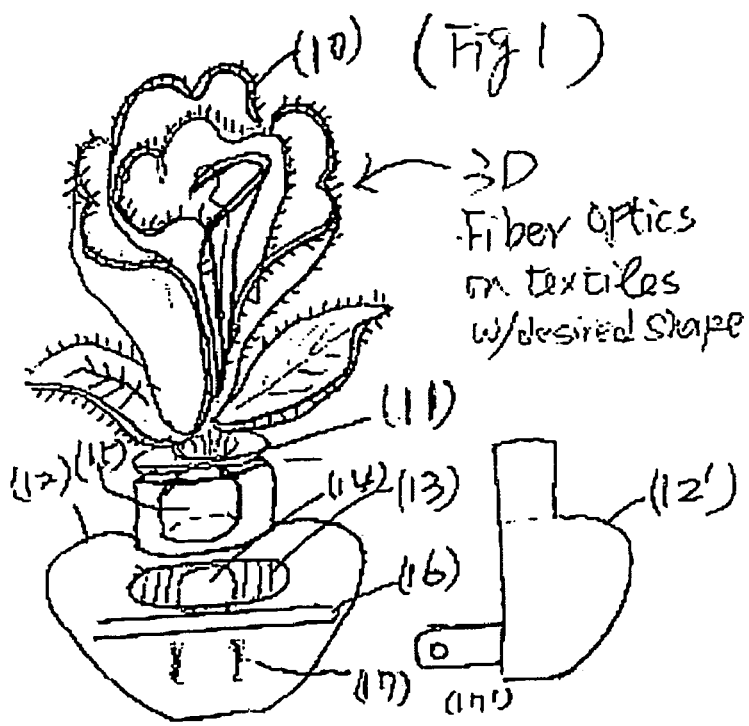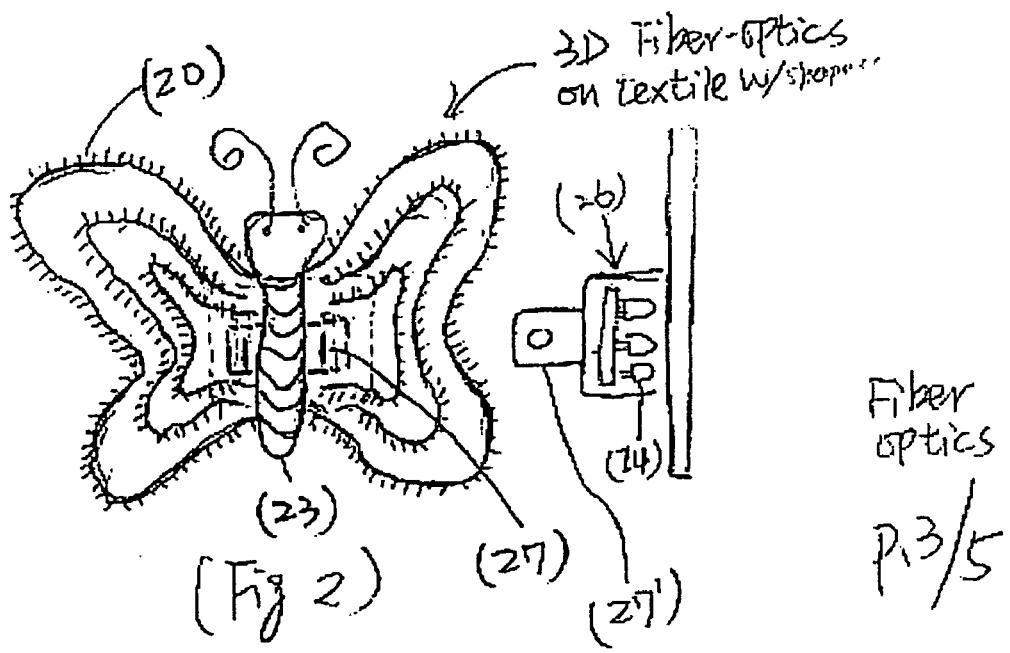

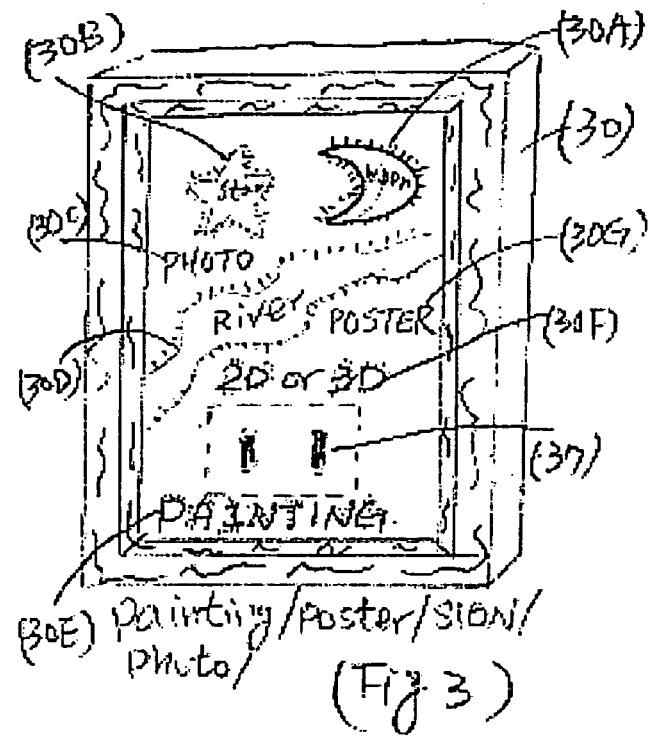
(Fig 3)
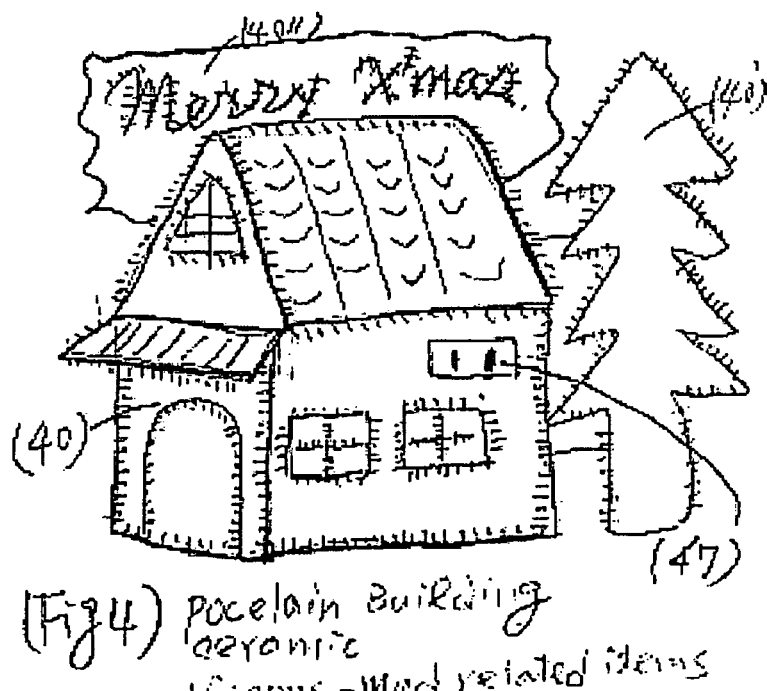
(Fig 4) Porcelain Building / ceramic / Viscous-Mud related items

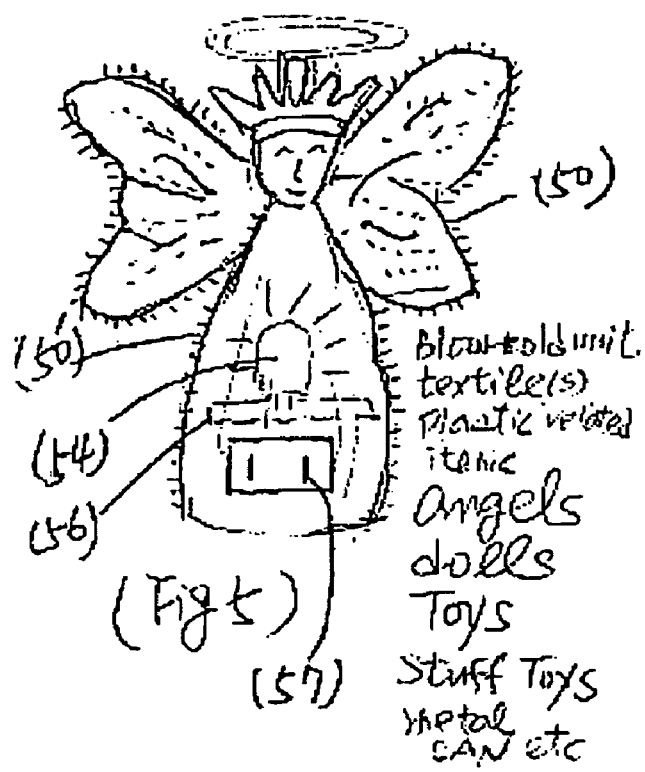
(Fig 5)
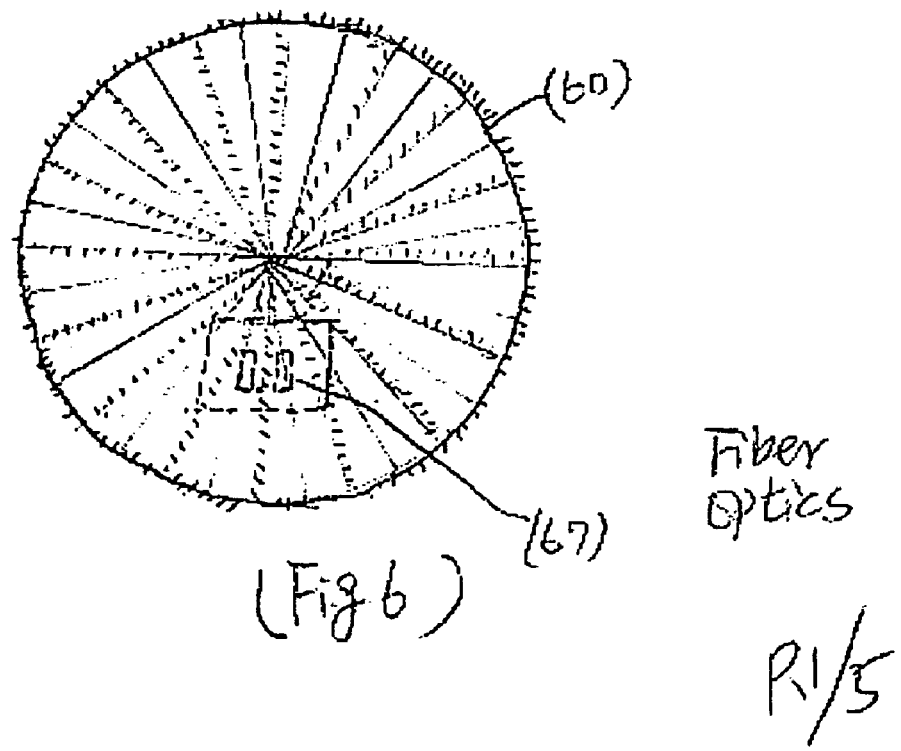
(Fig 6)

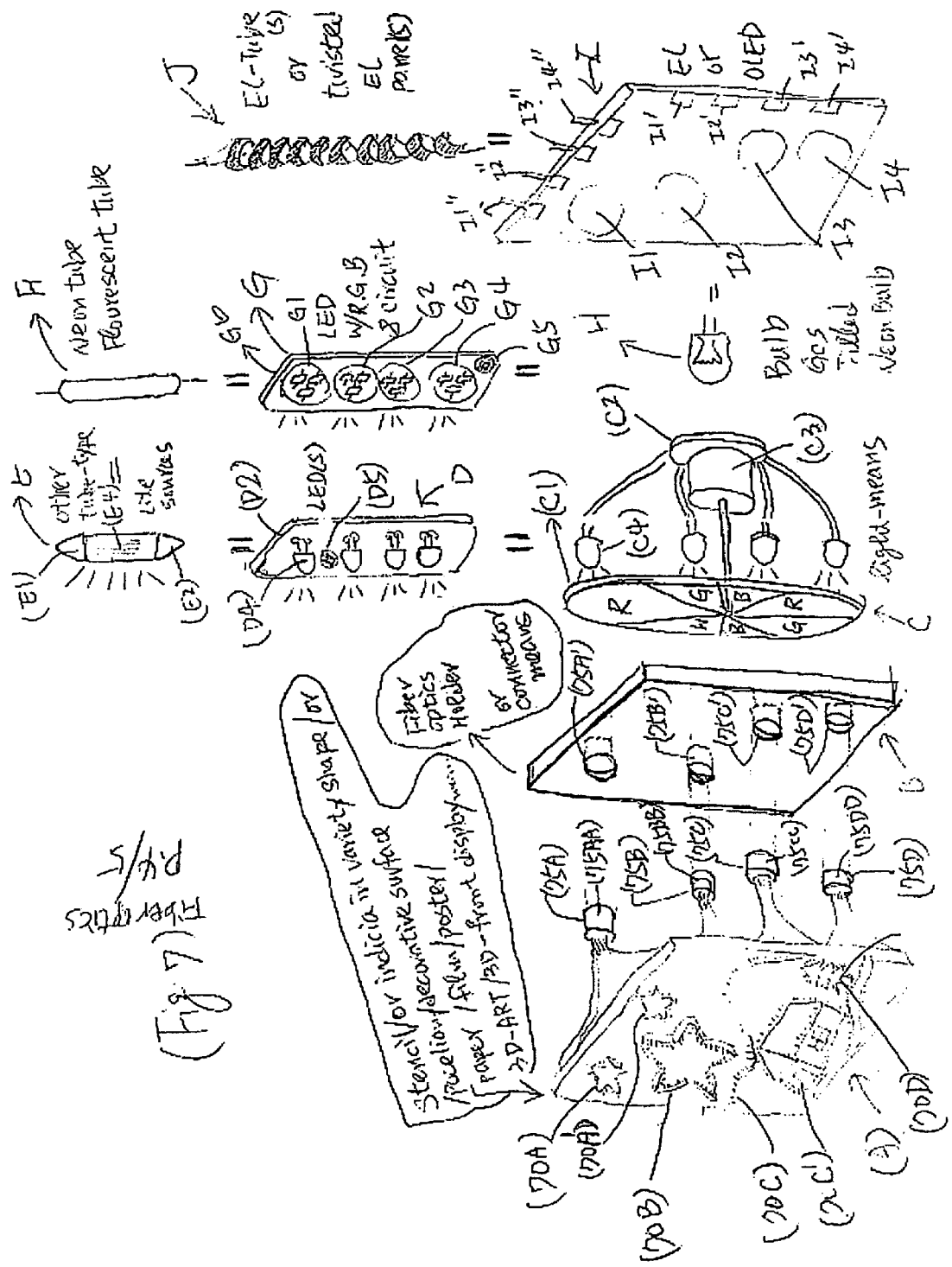

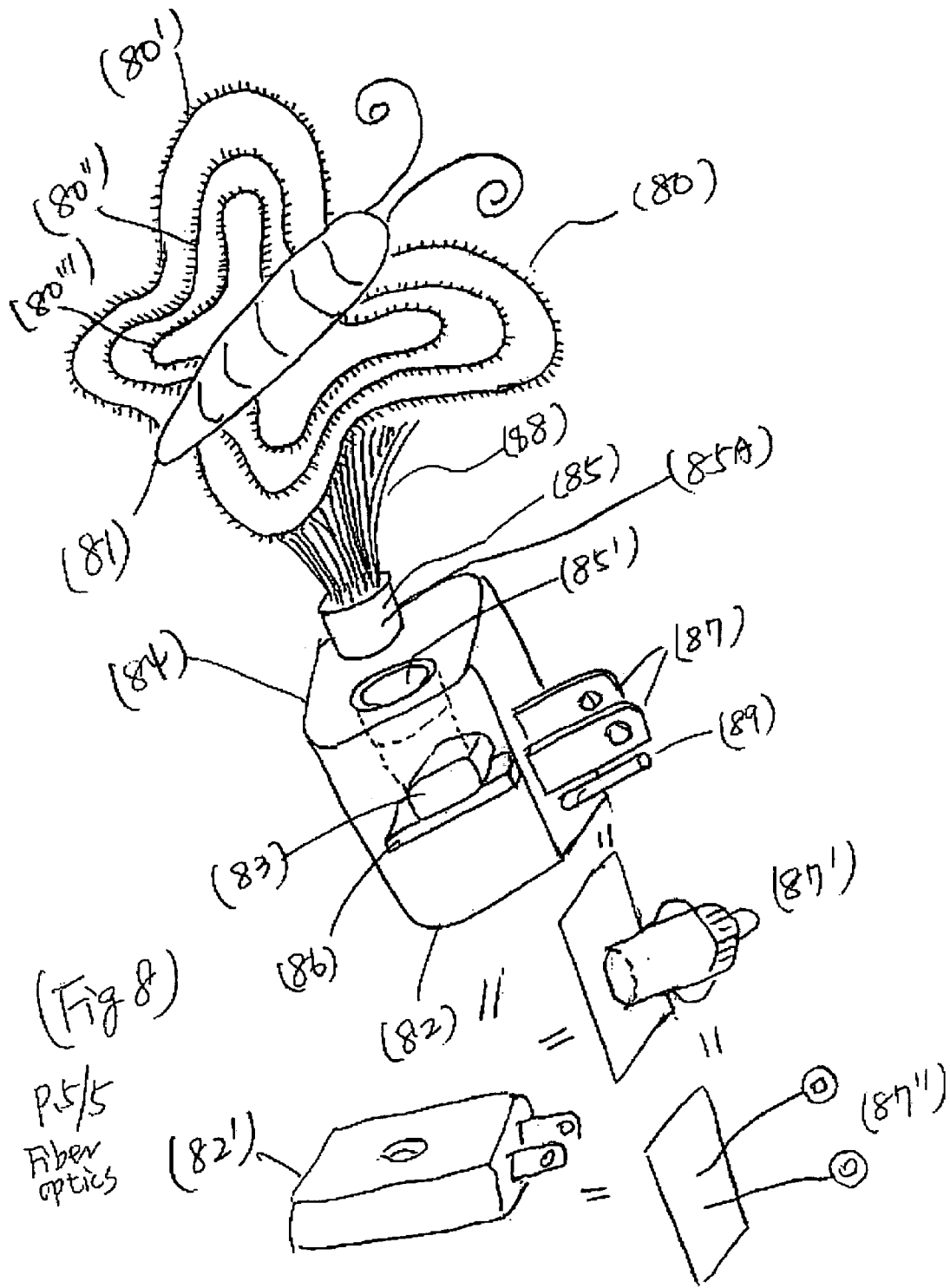

NIGHT LIGHT WITH FIBER OPTICS

BACKGROUND

This application is related to Ser. Nos. 10/883,747 and 10/954,189 and 10/667,787 and 10/286,871.

The Inventor's prior art U.S. Pat. Nos. 5,926,440, 6,158,868, 6,170,958, 6,171,117, and 6,280,053 disclose arrangements for the conductive means of night lights including a multiple function night light incorporated with a time piece. Other patents include U.S. Pat. Nos. 4,947,291, 5,495,402, 5,662,408, 5,713,655, 5,803,579, 5,816,682, 5,833,350, 5,893,626, 5,998,928, 6,000,807, 6,010,228, 6,031,958, 6,033,087, 6,056,420, 6,132,072, 6,160,948, 6,161,910, 6,183,101, 6,190,017, 6,290,368, 6,337,946, 6,386,730, 6,390,647, 6,000,104, 6,411,524, 6,431,719, 6,509,832, 6,523,976, 6,550,949, 6,609,812, 6,623,416, 6,641,289, 6,648,496, 6,709,126 show different light sources and applications, but none of these applications and patents teach a night light incorporated with a fiber optics light means.

The night light with fiber optics can let visible wavelength light beams be seen by a viewer though the fiber optics arranged on a main object so provide a large number of light spots with splendid light effects and a valuable appearance of the night light.

The night light with fiber optics of the current invention creates the plurality of light spots by fiber optics and selected light means such as LEDs or other light means such as a bulb, gas filled light, neon bulb, groups of LEDs, neon tube, discharge tube, black tube, linear light source, EL or OEL lamp, EL tube, EL bundles, and/or EL wires with related circuits to create the desired light effects.

The night light with fiber optics can be arranged with fiber optics on a main object made of metal, plastic, viscous-mud related material, porcelain, ceramic, wood, glass, non-metal, poly resin, plastic resins, paper material.

The night light with fiber optics arranged on the main object can be used in various applications such as a toy, gift, souvenir, seasonal unit, holiday unit, painting, poster, sign, photo, artificial flower, doll, porcelain unit, ceramic unit, viscous-mud related unit, blow-mold unit, stuff toys unit, promotion unit, or any other conventional unit available in the marketplace. The main object may be properly arranged with a stencil, indicia, front sheet, cover piece, and/or outside appearance piece having fiber optics arranged to create the expected light effects. The addition to the main object of a fiber optics light means and its related circuitry will enhance the light effects when the night light's prong is inserted into a wall outlet receptacle.

The night light with fiber optics may incorporate proper circuit means which can provide steady, chasing, random, fade in and fade out, sequential, color mixed, color changing, pair flashing or any combinations of available light effects. All of these functions can be designed to exhibit predetermined timing, duration, order, and functions as required.

The night light with fiber optics may be incorporated with other electric devices such as a motor, movement detector, filter device, IC chip with desired functions, sensor, and/or rotating filter to provide preferable light effects and functions.

The light means may be selected from the group consisting of an EL lamp, LED, gas filled bulb, black tube, fluorescent tube, strobe tube, and/or neon bulb with related circuit means to provide proper illumination with desired functions and effects.

The fiber optics are arranged on the main object and deliver light beams having a visible wavelength to illuminate plurality of lighted areas or spots when prong means are connected with a power source. The light means can create a large number of lighted areas or spots to provide a splendid light appearance and delicate light applications for buildings and moving transportation equipment with proper prong means.

DRAWINGS

FIG. 1 includes front and side views of a night light with fiber optics according to a first preferred embodiment of the invention.

FIG. 2 includes front and side views of a night light with fiber optics according to a second preferred embodiment of the invention.

FIG. 3 is a perspective view of a night light with fiber optics according to a third preferred embodiment of the invention.

FIG. 4 is a perspective view of a night light with fiber optics according to a fourth preferred embodiment of the invention.

FIG. 5 is a front view of a night light with fiber optics according to a fifth preferred embodiment of the invention.

FIG. 6 is a front view of a night light with fiber optics according to a sixth preferred embodiment of the invention.

FIG. 7 is an exploded perspective view of a night light with fiber optics illustrating details of construction of the preferred embodiments of the invention.

FIG. 8 is an exploded perspective view of the night light of FIG. 2.

DETAIL DESCRIPTION

FIG. 1 shows a night light with fiber optics including a main object (10) and a lot of fiber optics of preferred diameter glued on a textile with certain spacing and density A lot of different colors of textile folded into a rose shape and leaves (10) become the main object in this embodiment. The fiber optic wires are cut at the one end to form a bundle (11). The bundle is sealed inside of holder means (15). The holder means (15) are aligned with light means (14) to get the best light beams to pass from the light source (14) to the bundle (15) and illuminate all the light spot(s) with a predetermined brightness, color, functions, duration, and/or effects such as chasing, flashing, random flashing, fade in and fade out, changing color, changing light areas, changing brightness, flashing in response to sound, flashing in response to motion, steady burn, or other light functions and effects which are available on the conventional market. An extra switch means (not shown) can be located on the night light and let people select the preferred function to increase the value of the night light. This switch is optional depending on market requirements.

The light means (14) may be an LED, LED(s), EL, OEL, OLED, fluorescent tube, neon tube, black tube, neon bulb, gas filled bulb, strobe tube, discharge tube or the other light device with light beam output to the viewer. The light means (14) are positioned relative to the fiber optics bundle (15) to get the best light effects as required.

The main object (10) has a base (12) which may have a brighter area (13). The brighter area (13) lets the light beams emit out from the light source (14) to the viewer. The brighter area (13) also can be designed as required so as to have multiple directions with the brighter light beams being seen by the viewer. The prong means (17) are located on the other side to allow the night light to get a power source. A circuit means (16) supplies the preferred electric signals to the light means (14) so as to drive the bundle of the fiber optics to exhibit the desired functions and effects as described above. The brighter area (13) is optional depending on market requirements.

FIG. 2 shows a butterfly shape as the main object in a three-dimensional configuration with a brighter area (23) to emit light to the viewer. A plurality of fiber optics are arranged on the pre-printed cloth and form a butterfly shape (20) with three-dimensions. The prong means (27) are arranged under the butterfly and connect with a power source to cause the fiber optics to illuminate the contour of the butterfly. Not only is the biggest contour lighted but also the middle contour and inner contour are also be lighted.

FIG. 3 shows a painting (30) which may be a main object. The main object (30) has lighted area(s) (30A) (30B) (30C) (30D) (30E) (30F) (30G). These lighted areas have a plurality of fiber optics arranged so that very splendid light beams are emitted out from the painting. Incorporating circuit means can make all these light beams exhibit changing colors, brightness, on-off time, duration, sequential and other available light effects to make an eye-catching lighting show as required. It also can be designed with a brighter area (not shown) on the lower edge to make the floor be illuminated with brighter light beams.

FIG. 4 shows a porcelain house (40), tree (40'), and sign (40") for seasonal application. The porcelain house or building or church are very popular for seasonal gifts with a three-dimensional configuration and various details of market available products. The prong means (47) on the back of the main object (40) (40') (40") to provide power for light means (not shown) for illumination. This embodiment may utilize a viscous mud related material such as porcelain, ceramic, etc., which need to be formed into shape and fired to make it harder and provide color and details. This kind of main object can be in the form of any scene such as a church, building, religion related items, animal, fruit, vegetable, sport related items, commodities related item, and/or painting, which may include a drawing, stencil, image, scene, or view.

FIG. 5 shows a seasonal angel with a halo, wings (50) and body (50') to form a main object. The light means (54) is inside the body (50') and connected with a circuit means (56). Prong means (57) supply the power to circuit means (56) to cause the light means (54) to be illuminated. The body (50') can be made of very good light transmitting material such as a clear plastic sheet in a circle with white clothing so the inner light beams can be emitted out to a viewer with a brighter area. The wing (50) has a plurality of fiber optics arranged on the contours and inner space so as to provide very splendid light effects. The light means (54) may have a color changing device which can be made up of LEDs with IC control or by the rotating filter with LEDs to create a plurality of fiber optics illuminated with color changing effects. Alternative methods are available such as use of an EL, OLED, OEL, neon tube, neon bulb, discharge tube or other light means to get the same functions and effects.

FIG. 6 shows another design that uses a lighted wheel as a main object (60). The interior may have a disc surface with a plurality of fiber optics installed on the surface and a contour with proper circuit means and light source design to provide the whole disc with very good and splendid light effects.

FIG. 7 shows one of the embodiment's detailed construction, including a main object, holder device, and light means. The main object (A) has an indicia, drawing, stencil, or design (70A) (70A') (70B) (70C) (70C') (70D) and fiber optics bundles (75A) (75B) (75C) (75D). The indicia area (70A) and (70A') includes fiber optics bundle (75A). The indicia area (70B) has the bundle (75B). The drawing area (70C) (70C') have the bundle (75C). The design area (70D) has the bundle (75D). Each bundle includes a tightening means to hold all fiber optics wires tightly. The bundle (75A) has the tighten means (75AA) and aligns with the holder means (75A'). The bundle (75B) has the tighten means (75BB) and aligns with the holder means (75B'). The bundle (75C) has the tighten means (75CC) and aligns with the holder means (75C'). The bundle (75D) has the tighten means (75DD) and align into the holder means (75D'). The holder means incorporates the light means (C) or (D) or (E) or (F) or (G) or (H) or (I) or (J) for different light means to provide the indicia (75A) (75A') (75B) (75C) (75C') (75D) with a desired illumination and brightness, color, time, duration, functions, or effects as requirement. The bundle number from the main object can be from number 1 to any number depending on the number of areas to be illuminated with certain light effects. The other consideration is the diameter of bundle against the space allowance. If space is too limited, bundles with smaller diameter may be fitted into the limited space. The bundle number and diameter will affect the space and design.

The light means (C) with a rotating filter means (C1) is connected with the motor means (C3) to position the filter different color areas R, G, B, W on the front of the light means (C4), which can be gas filled bulb, or LED, or OLED, or OEL, or LEDs. The light means (C4) are connected with circuit means to obtain electric signals that cause the light means (C4) to exhibit desired functions and effects.

The light means (D) has a similar function to the light means (C). The light means (D) has a plurality of LEDs or gas filled bulbs (D4) connected with the circuit means (D2) and IC (D5) to provide the desired light effects and functions. The IC means (D5) includes electric components and parts capable of providing functions and effects which will be same as those of the light means (C) for changing color, but with a simple and slim arrangement for the assembly work.

The light means (E) has similar functions to the light means (D). The light means (E4) can be one of a gas filled bulb, neon tube, and/or LED inside tube, with two connectors at the signal ends. The light emitted out can be a full range visible wavelength light such as white light from a conventional bulb type, or part of the visible wavelength spectrum from an LED, neon, or EL lamp. The two connector ends (E1) (E2) with big area contact areas are very simple for assembly work. The light means (D) are connected with the circuit means to make the preferred light functions and effects.

The light means (F) is any kind of linear light means and may be selected from commercially available types such as a fluorescent tube, neon tube, black tube, high voltage discharge tube, gradation tube, strobe tube etc. The linear light tube can have changeable color changing and lighted areas to make a predetermined desired light show.

The light means (G) has several areas (G1) (G2) (G3) (G4) on a PCB (G6) with IC means (G5) to provide the desired functions. Each area (G1) (G2) (G3) (G4) has at least three LEDs to provide the desired light show including the color change, color combination, duration time, or sequential, chasing or other conventional light functions and effects under the control of IC means (G5), which provides electric signals to each one of the LEDs in the area. None of the light beam output is to be seen by the viewer directly because all the light beams pass though the fiber optics bundle to create the light effects. This is not the same as the arrangement disclosed in prior art U.S. Pat. No. 6,431,719 for directly viewing LED light beams without passing through any light passing medium such as fiber optics means.

The light means (H) is a conventional gas filled bulb with at least one filament inside. Other preferred designs of the filament, base, and/or bulb shape may also be used to meet market requirements, such as a wedge type, round type, flat type etc. The light means (H) are connected with circuit means to provide the light means with desired functions and effects.

The light means (I) is one kind of super thin light means which can be selected from an EL, OEL, OLED element in a sheet form with selected areas arranged to emit light with desired colors. The selected areas (I1) (I2) (I3) (I4) each have a respective electrode (I1') (I2') (I3') (I4'). The electrodes can be contact area type electrodes (I1') (I2') (I3') (I4') which can easily be connected to circuit means by a resilient conductive spring or rubber piece with conductive wires to enable electric delivery. An alternative electrode can be a clamp terminal type such as (I1") (I2") (I3") (I4") which also can be a pin type glued-on the electrode such that the metal conductive piece extends to outside of the light means. A variety of alternative methods or equivalent terminals or electrode treatments will still fall within the scope of the current invention.

The light means (J) is also one kind of super thin light means which is made up of a flexible EL, OEL, or OLED bent into a spiral, coil, or twisted configuration as described in the Inventor's U.S. patent application Ser. Nos. 10/170, 584, 10/286,871, 10/286,820, and 10/341,519. The light means also can use a variety of small diameter EL wires to make a coil or spiral design with preferred circuit means to provide desired light functions and effects.

The electric signal delivery between the prong means and circuit means of the night light with fiber optics can be accomplished in many different ways. The prong means may connect with the circuit means by any combination of resilient conductive means, conductive wires, conductive metal pieces, conductive soldering paste with conventional soldering, snapping, and/or clip means to deliver electricity from the prong means to the circuit means.

In addition, the circuit means connect with light means to deliver the electric signals by any combination of the above-mentioned resilient conductive means, conductive wires, conductive metal pieces, conductive soldering paste with conventional soldering, snapping, and/or clip means to deliver the electricity from the circuit means to the light means.

As shown in FIG. 8, the butterfly main object (80) also shown in FIG. 2 includes fiber optics arranged on the big contour (80'), middle contour (80"), and inside contour (80''') for illumination though a variety of the fiber optic wires' ends. The main object (80) also has a brighter area (81) which is made of plastic resin with a body configuration that aligns with inner light means (83) and has greater brightness than the fiber optics means. The fiber optic wires (88) are arranged into a single bundle (85) with tightening means (85A) to secure the fiber optic wires (88) into the holder means (85') perfectly. The light means (83) may be selected from the above discussed light means in combination from (A) to (J) or any other commercially available light means. All the light beams passing though the fiber optics means to viewer are emitted under control of the circuit means (86) when the prong means (87) is connected with the power source. The prong means (87) also may incorporated with a ground pole (89) or equivalent device which may be selected from the group including a cigarette lighter (87'), or conductive wires (87") for the interior night light of moving transportation equipment such as a car, van, boat, bus, vessel, aircraft. The main object may have a base (82) or the (82') with different shapes and prong means in the form of a blade (87) or cigarette lighter connector (87') or wires (87") for connecting with a power source or with the ground pole (89).

Any of the above discussed light means from (A) to (J) can be the light means for fiber optics of the main object. All the light means have certain visible wavelength to make preferred light effects and brightness and colors depending on market requirements. The light means do not show the light directly to the viewer but though the fiber optics, so that the light beams can exhibit a design, indicia, or drawing of the main object, or have a plurality lighted spots and areas. Those skilled in the art will appreciate that the preferred embodiments are presented to explain the spirit of the current invention but should not be taken as limiting to the full range of current invention.

The invention claimed is:

1. A night light with fiber optics, comprising:
   light means for emitting light;
   at least one prong means built into said night light for supplying electricity to said light means when said prong means is connected with a power source;
   at least one main object;
   fiber optic means attached to said main object for transmitting light from said light means to form a plurality of lighted spots, said fiber optic means being arranged in bundles of optical fibers; and
   IC means for controlling said light means to provide predetermined illumination functions and effects.

2. A night light as claimed in claim 1, wherein said light means is selected from the group consisting of at least one LED; EL, OEL, or OLED element; gas filled bulb; fluorescent tube, black light; neon tube; strobe light; neon bulb; discharge device; and combinations of any of the foregoing lighting elements.

3. A night light as claimed in claim 1, wherein said functions controlled by said IC means include on/off timing, brightness, color, and duration.

4. A night light as claimed in claim 1, wherein said main object includes a body and at least one of a stencil, front piece, cover, and display surface, wherein said at least one of a stencil, front piece, cover, and display surface has a predetermined design, indicia, shape, or configuration.

5. A night light as claimed in claim 1, wherein said main object is made from a material selected from the group consisting of metal, glass, pottery, wood, ceramic, porcelain, viscous-mud related material, plastic, poly resins, plastic resins, paper, bamboo, and textile.

6. A night light as claimed in claim 1, wherein said effects controlled by the IC means include one or more of the following effects: steady-on, chasing, random, pair flashing, fade in/fade out, or scan effects.

7. A night light as claimed in claim 1, wherein said main object is selected from the group consisting of a toy unit, gift unit, stuffed toy unit, blow0molded unit, textile unit, seasonal unit, plastic unit metal unit, porcelain unit, ceramic unit, viscous-mud unit, painting unit, poster unit, sign unit, photo unit, doll unit, promotion unit, advertisement unit, give away unit, holiday items, artificial flower, lava unit, aquarium unit, and water ball unit.

8. A night light as claimed in claim 1, wherein said night light further incorporates a device selected from the group consisting of a moving mechanism, filter, rotating device, electric device, circuit, sensor, switching device, scent device, motion sensor device, and receptacle.

9. A night light as claimed in claim 1, wherein said fiber optic means are arranged on the main object and light is emitted from ends of said optical fibers.

10. A night light as claimed in claim 1, wherein said optical fibers include cut-outs for emitting light along a length of said fibers.

11. A night light as claimed in claim 1, further comprising additional said light means for providing different lighting functions.

12. A night light as claimed in claim 1, wherein said prong means further includes a ground prong.

13. A night light as claimed in claim 1, wherein said prong means is connected to said IC means by connection elements selected from the group consisting of a resilient conductive member, conductive wires, a conductive metal piece, conductive soldering paste, snaps, and clips.

14. A night light as claimed in claim 1, wherein said IC means is connected to said light means by connection elements selected from the group consisting of a resilient conductive member, conductive wires, a conductive metal piece, conductive soldering paste, snaps, and clips.

* * * * *